United States Patent [19]

Painter

[11] 4,231,616
[45] Nov. 4, 1980

[54] COMBINED SHOULDER HARNESS AND LAP BELT RESTRAINT APPARATUS HAVING SINGLE FASTEN/RELEASE POINT AT LAP BUCKLE

[75] Inventor: Mark C. Painter, Bellevue, Wash.

[73] Assignee: The Boeing Company, Seattle, Wash.

[21] Appl. No.: 67,479

[22] Filed: Aug. 17, 1979

[51] Int. Cl.³ .................. A62B 35/00; B64D 11/06
[52] U.S. Cl. ............................. 297/481; 280/808; 297/468; 297/484
[58] Field of Search ............ 297/483, 484, 481, 465, 297/468; 244/122 B, 122 R; 280/808

[56] References Cited

U.S. PATENT DOCUMENTS

| | | | |
|---|---|---|---|
| 2,195,334 | 3/1940 | Lethern | 244/122 B |
| 2,403,653 | 7/1946 | Geohegan et al. | 244/122 B |
| 2,576,867 | 11/1951 | Wilson, Jr. | 244/122 B |
| 3,633,965 | 1/1972 | Norman et al. | 297/484 |
| 3,819,197 | 6/1974 | Shakespear | 297/481 X |
| 3,954,280 | 5/1976 | Roberts | 280/808 X |
| 3,982,769 | 9/1976 | Farlind | 297/481 |
| 4,099,778 | 7/1978 | Lehr | 297/484 X |

FOREIGN PATENT DOCUMENTS

| | | | |
|---|---|---|---|
| 1359229 | 3/1964 | France | 297/484 |
| 870423 | 7/1961 | United Kingdom | 280/808 |
| 930802 | 7/1963 | United Kingdom | |
| 1056714 | 1/1967 | United Kingdom | 297/484 |

*Primary Examiner*—James T. McCall
*Attorney, Agent, or Firm*—Christensen, O'Connor, Johnson & Kindness

[57] ABSTRACT

A single fasten/release point is provided in a combined shoulder harness/lap belt restraint of the type having a pair of shoulder straps that extend from a behind-the-head anchor point (or points) down over the occupant's shoulders to side anchors located adjacent opposite sides of the seat, and a center-buckled lap belt that passes between the side anchors across the occupant's lap. The ends of the shoulder straps are looped through friction guides provided on corresponding side anchors and joined to an intermediate fastening point on the adjacent portion of the lap belt in a manner that allows for both slackening of the shoulder straps when the lap buckle is released, and adjustability of the lap belt length when the buckle is fastened. Additionally, breast-high shoulder strap adjusters are provided with auxillary connectors to which the separated, complementary parts of the belt buckle can be releasably attached, for stowing such buckle parts and the adjoining portions of the shoulder straps and lap belt in an orderly configuration, ready for quick donning.

9 Claims, 4 Drawing Figures

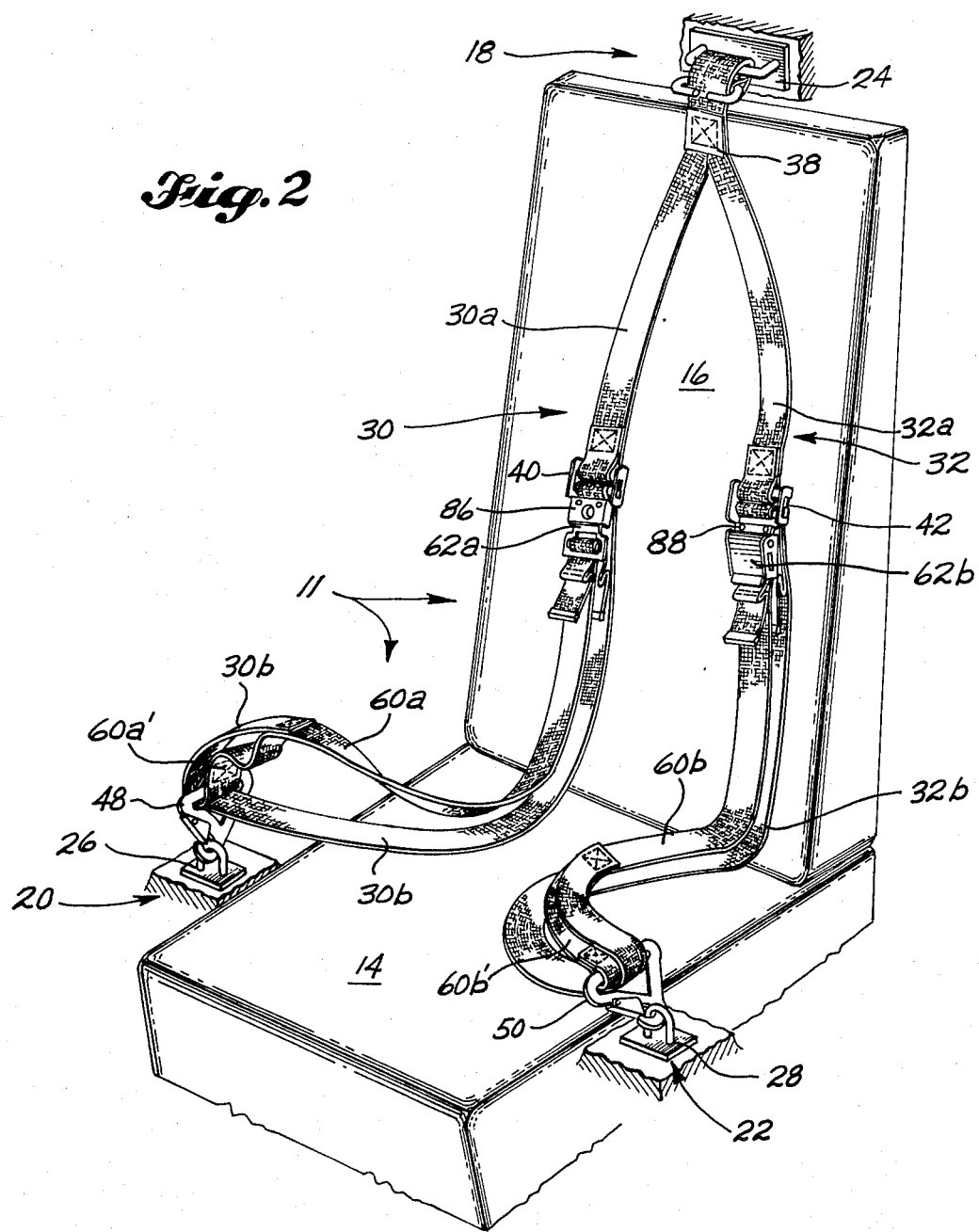

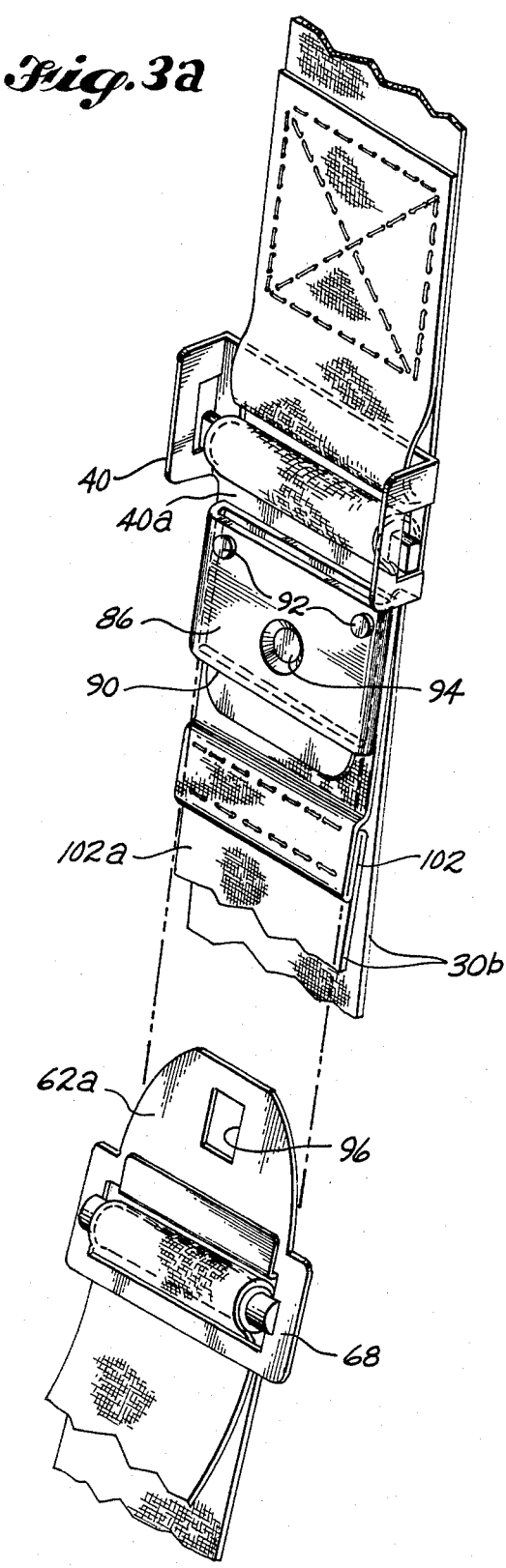
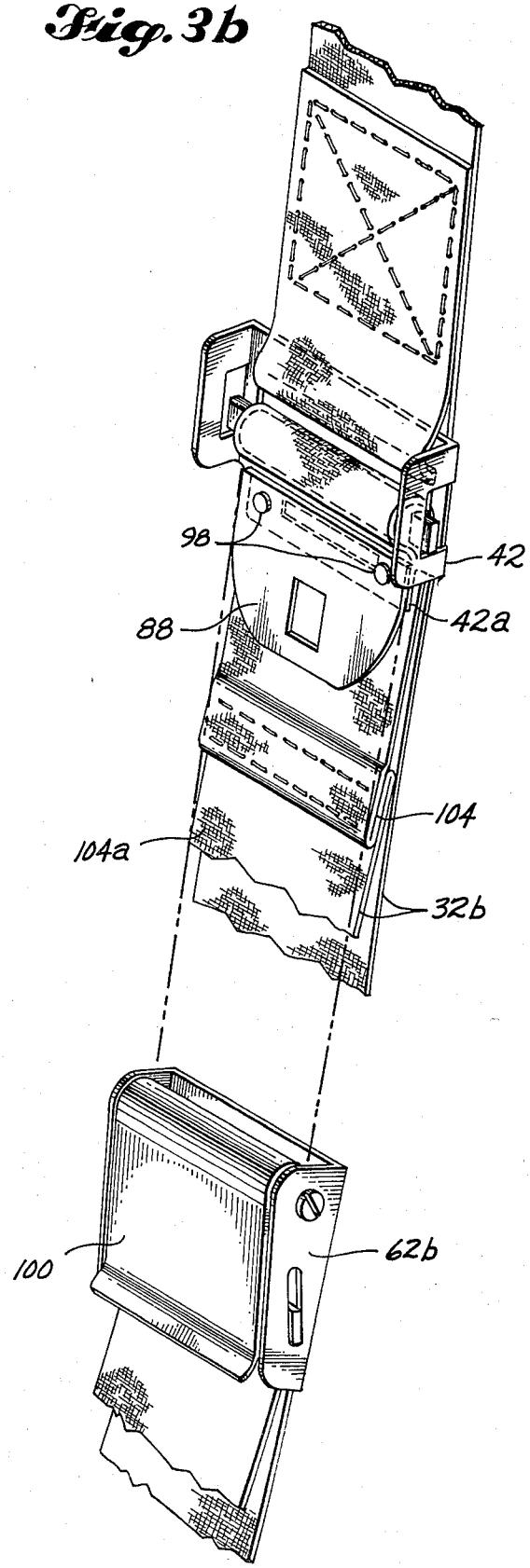

COMBINED SHOULDER HARNESS AND LAP BELT RESTRAINT APPARATUS HAVING SINGLE FASTEN/RELEASE POINT AT LAP BUCKLE

BACKGROUND

The invention relates to combined shoulder harness/lap belt restraints of the type having a pair of shoulder straps anchored behind the head and extending down over the occupant's shoulders to lower, side anchor points adjacent opposite sides of the seat, and a lap belt extending from one side anchor, across the occupant's lap, and connected to the opposite side anchor.

Restraint apparatus of the foregoing configuration are sometimes called five-point or six-point anchor systems based on the total number of points at which the various shoulder straps and lap belt ends are anchored. In a five-point anchor system, the upper ends of the shoulder straps are merged in an inverted Y configuration and jointly fastened to a single, behind-the-head anchor point, and the lower ends of the shoulder straps are separately anchored to the side anchor points as are the opposite ends of the lap belt, thereby totaling five separate anchor locations. In a six-point anchor system, the shoulder straps are individually connected to separate, behind-the-head anchors, resulting in one additional anchor point over the five-point configuration.

Restraint apparatus of this type have been shown to be more effective, on an overall basis, in reducing the potential for bodily injury under dynamic load conditions associated with a crash impact. For example, five and six-point restraint systems as characterized above, have been found more effective than other common restraints of the combined, shoulder harness and lap belt type such as the bandolier configuration—a lap belt and a single shoulder strap crossing the upper torso; the three-point restraint—a lap belt and two shoulder straps extending from a single behind-the-head anchor and first diverging to pass on opposite sides of the occupant's head and then extending downwardly in a convergent fashion to a center-buckle fastening point at the midpoint of the lap belt; and the four-point restraint—similar to the above three-point system except that the upper ends of the shoulder straps are independently attached to separate, spaced apart anchors located above and behind the occupant's shoulders.

Five and six-point anchor systems have been particularly effective in minimizing the tendency of the occupant's body to submarine (rotation of the pelvis accompanied by slippage of the pelvis region under the lap belt) and in minimizing lumbar compression (axial compression of the spine). It is believed that the effectiveness of this type of restraint is due in part to the independent anchoring of the shoulder straps and lap belt ends so that under dynamic loading each shoulder strap, and the lap belt are held snugly against the occupant's body, without tending to loosen at one restraint location in reaction to an excessive tension load at another strap or belt location.

For example, in certain prior combined shoulder harness and lap belt restraints, the shoulder strap and lap belt portion on each side of the seat are made as one continuous web anchored by a slip fitting to structure on the corresponding side of the seat. Such a system, in reaction to certain impact conditions allows the pelvis to be accelerated against the lap belt in such a manner that the continuous lengths of webbing are pulled through the slip fittings at the sides of the seats, taking slack from the upper portions of the webbing that serve as the shoulder straps. The lap belt is thereby lengthened to a degree that significantly increases the risk of submarining. Conversely, excessive acceleration of the upper part of the occupant's torso places such force on the shoulder straps that some of the webbing is pulled through the slip fittings causing excessive tightening or cinching of the lap belt, which may result in injury to the abdominal or pelvic region of the occupant. Thus, the independent anchoring of the shoulder straps and lap belt ends provided by the five and six-point anchor systems, has proved to be a desirable, and in some cases critically important feature.

While the five and six-point restraints having independent strap and belt anchoring have proven safety advantages when properly worn, this type of restraint configuration, as heretofore constructed, does not lend itself to ease and quickness in donning and removal. Unlike other restraints such as the bandolier and three-/four-point systems which can readily accommodate a single-point release, the five and six-point systems have in most applications, required two or more release points, such as provided by a pair of devices at each side anchor for jointly releasing the lower ends of the shoulder straps and the adjacent ends of the lap belt. A single-point release at one side anchor of the five and six-point restraints can be combined with a suitable shoulder strap adjuster for lengthing and cinching the nonreleasing shoulder strap, however, such a configuration has been found difficult to use and for this reason has not been widely adopted. The continuous web type of restraint, which is described above, is, unlike the five and six-point restraints, readily adapted to a single-point release. One buckle located at the center of the lap belt can be released to cast off the lap belt, and at the same time loosen the shoulder straps by virtue of the continuous web and slip fittings at the side anchor points. However, the slip fittings which facilitate the release of the restraint, are the cause of the above-mentioned, undesired interaction between lap belt tension and shoulder strap tension.

The foregoing advantages and disadvantages of the various restraint systems apply with even greater import in the case of restraints used on aircraft. The five and six-point anchor systems, when used for example by flight attendants on commercial aircraft, may be able to reduce the risk of at least certain kinds of bodily injury in the event of a crash. However, the difficulty in donning and escaping from this type of restraint system is a serious drawback when proposed for use by flight attendants, who are usually the last to sit down and secure their restraints, and must be the first to release and shed their restraints for giving aid in the case of an emergency.

Accordingly, an object of the invention is to provide a combined shoulder harness and lap belt restraint that affords optimum protection against bodily injury under crash conditions, and at the same time provides the convenience, ease and safety of a single-point fasten/release feature.

Another object is to provide the above-mentioned single-point fasten/release feature in a combined shoulder harness and lap belt restraint of the five and six-point anchor type system characterized by independent anchoring of the ends of the shoulder straps and lap belt.

An additional object is to provide such a combined shoulder harness and lap belt restraint of the five and six-point anchor type, incorporating the single-point fasten/release feature, and that further has the capability of being quickly arranged in a stowed configuration which enhances the ease and quickness with which the restraint can be donned, particularly under emergency conditions.

Still another object is to provide such a combined shoulder harness and lap belt restraint having one or more of the above advantages, and further provides the capability of being adjustable to an extent that enables the restraint to fit occupants of widely varying size.

SUMMARY OF THE INVENTION

The invention is embodied in a combined shoulder harness and lap belt restraint apparatus of the five (or six-point) type, in which first and second shoulder straps extend fowardly from behind the head anchorage and pass over the occupant's shoulders and thence downwardly along the sides of the occupant's upper torso toward first and second side anchors located adjacent opposite sides of the seat below lap level, and in which a lap belt passes across an occupant's lap and is formed by first and second lap belt portions that are releasably connected together at their adjacent ends by a lap buckle and are separately and affixedly fastened at their remote ends to the first and second side anchors, respectively. The improvement according to the invention provides anchor guides mounted on each of the first and second side anchors through which the downwardly extending end portions of the first and second shoulder straps are respectively looped. The end portions of the thusly looped shoulder straps are drawn inwardly from the first and second side anchors so as to lie in superposition along the first and second lap belt portions. The ends of the shoulder straps are then attached to the corresponding first and second lap belt portions at intermediate points thereon located inboard of the side anchors and outboard of the lap belt buckle so that when the buckle is released and the thusly disengaged buckle parts are pulled apart, the shoulder straps are consequently loosened by allowing the shoulder straps to slip, in the absence of tension, back through the anchor guides up until such slippage is stopped by the strap-to-lap belt joints encountering the anchor guides. Thus, the occupant can, by disconnecting a single lap buckle, open the lap belt and thereby sufficiently slacken the shoulder straps to withdraw from the shoulder harness.

Preferably, to maintain the desired tension load independence between the lap belt and the shoulder straps, each of the guides provided on the first and second anchors are constructed to cooperate with the associated shoulder strap as a non-slip friction fitting that prevents any slipping of the shoulder straps through the anchor guides when the shoulder straps are placed under tension. Such slip arresting tension will normally occur during a dynamic load condition resulting from the acceleration of an occupant's body against the restraint. It is observed that these non-slip friction fittings on the side anchors, eliminate the transfer of tension from the shoulder straps to the lap belt. The latter being directly fastened to the side anchors, remains snug, and cannot be loosened by pulling slack from the shoulder straps even if the non-slip fittings are omitted.

Also in the preferred form of the invention, the lap buckle has first and second interconnectable parts, each of which are provided with a belt length adjuster for adjusting the length of the corresponding lap belt portion while enabling the buckle to remain at the center of the lap belt. In such case, the ends of the shoulder straps are fastened to the lap belt portions at intermediate locations there along selected so as to maximize the amount of slack imparted to the shoulder straps when the buckle parts are released, while allowing for the needed adjustability of the lap belt adjusters down to a predetermined minimum length, before the adjusters are obstructed by the lap belt-to-shoulder strap attachment joints.

Still another preferred feature of the invention is to provide fastening devices on the shoulder straps at approximately breast height, so that when the buckle parts are separated, they each may be releasably attached to such shoulder strap fastening devices. In this manner, the buckle parts and entrained lap belt portions and adjoining shoulder strap ends can be stowed in an orderly configuration, ready for quick donning. Preferably, the shoulder strap mounted fastening devices are in the form of auxillary buckle parts, complementing the actual buckle parts, and are disposed on length adjusters incorporated in the shoulder straps.

To provide a complete disclosure of the invention, reference is made to the appended drawings and following description of one particular and preferred embodiment.

BRIEF DESCRIPTION OF THE DRAWINGS

FIG. 2 is another isometric view of the restraint apparatus of FIG. 1, depicting the apparatus in a stowed configuration in which it is disposed when not in use.

FIGS. 3a and 3b are fragmentary, isometric views of fastening devices provided on the shoulder strap length adjusters for receiving and releasably retaining the complementary, lap buckle parts when the apparatus is in the stowed configuration of FIG. 2.

DETAILED DESCRIPTION

Figure 1:
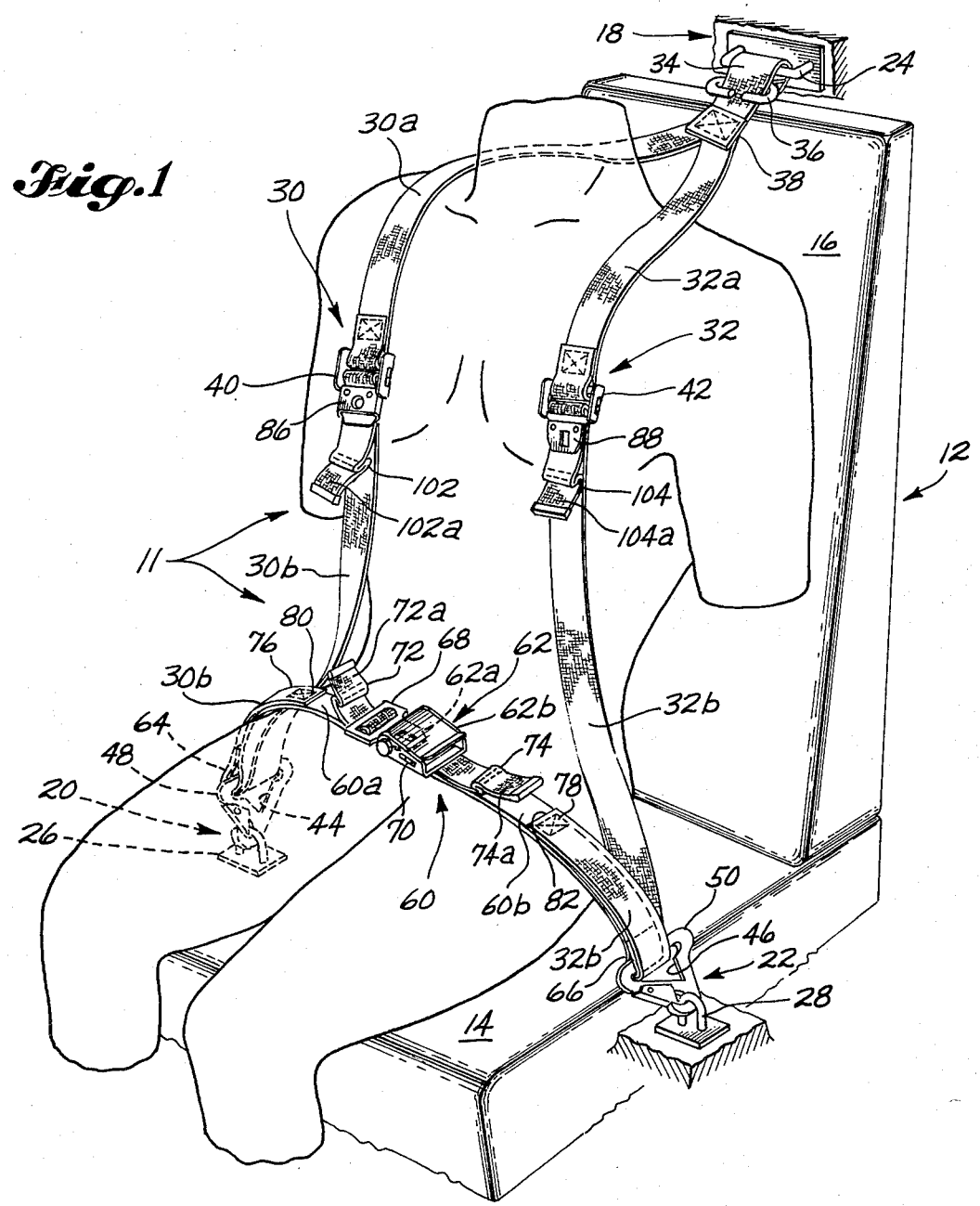
FIG. 1 is an isometric view of the combined shoulder harness and lap belt restraint apparatus of the invention, depicting its use.

With reference to FIG. 1, a combined shoulder harness and lap belt restraint apparatus 11, constructed in accordance with a preferred embodiment of the invention, is shown as used to restrain an occupant of a seat 12. Although restraint apparatus 11 may be installed and used in any of various environments where there is a need to protect a seated occupant against sudden acceleration and deceleration, this particular and preferred embodiment is specifically intended for use by flight attendants on a commercial airline carrier. As such, apparatus 11 must be capable of not only providing adequate protection of the flight attendant under crash conditions, but also must be capable of being both quickly donned and quickly removed.

Seat 12 has an associated seat pan 14 and a seat back 16 arranged so that restraint 11 can be installed by connecting it to at least one upper anchor point 18, located generally above and behind the neck and shoulder area of the occupant, and to first and second lower, side anchor points 20 and 22 positioned closely adjacent opposite sides of seat 12 and preferably below the level of seat pan 14. Upper anchor point 18 may be provided by a u-shaped bracket 24 firmly secured to a bulkhead or other suitable structure of the aircraft, and lower side anchor points 20 and 22 may be similarly provided by inverted u-shaped brackets 26 and 28 attached directly or indirectly to the seat or seat support structure of the aircraft.

In this illustrated embodiment, apparatus 11 is a five-point anchor system characterized by the single upper anchor point 18 and its associated bracket 24 serving as a securement for both shoulder straps 30 and 32 of the shoulder harness. In this configuration, a single web 34 is secured to bracket 24 by a conventional split-ring fastener 36 as illustrated. The upper and rearwardly converging ends of shoulder straps of 30 and 32 are attached to web 34 by an inverted y-shaped junction 38 formed by sewing the three web ends together. From junction 38 the shoulder straps extend as segments 30a and 32a forwardly over the occupant's shoulders and hence downwardly along corresponding sides of the upper torso. The downward extents of shoulder straps 30 and 32 include lower shoulder strap segments 30b and 32b, and shoulder strap length adjusters 40 and 42 which join together the respective upper and lower segments at an approximately breast-high location. Lower strap segments 30b and 32b are made longer than needed to reach anchor points 20 and 22 so that the lower ends of these segments can be looped through eye openings 44 and 46 of anchor hooks 48 and 50, respectively. This looping of segments 30b and 32b through hooks 48 and 50 is arranged, as more fully described below, so that the shoulder straps are allowed to slip through eye openings 44 and 46—only in the absence of tension. When the strap segments are placed under a tension load, eye openings 44 and 46 of anchor hooks 48 and 50 serve for the reasons described below as non-slip friction fittings.

A lap belt 60 of restraint 11 passes across the occupant's lap in the usual manner, and is affixed at the laterally opposed ends to the lower side anchor points 20 and 22 by means of anchor hooks 48 and 50. More particularly, belt 60 includes first and second lap belt portions 60a and 60b and a lap buckle 62 which serves as a single point of release for restraint apparatus 11. Lap belt portions 60a and 60b are affixed at their remote ends to anchor hooks 48 and 50 by reentrant attachment loops 64 and 66, respectively, formed by sewing the ends of the webs back on themselves. Attachment loops 64 and 66 are installed on hooks 48 and 50 first, prior to threading strap segments 30b and 32b through openings 44 and 46, so that the web material of lap belt portions 60a and 60b cover the inside surfaces of eye openings 44 and 46 contacted by the looped ends of lower shoulder strap segments 30b and 32b. Such an arrangement of loops 64 and 66 disposes the textured fabric of lap belt portions 60a and 60b on the inside edges of openings 44 and 46 so as to form a high friction contact surface on hooks 48 and 50 which prevents slipping of shoulder strap segments 30b and 32b through hooks 48 and 50 when the shoulder straps are under a tension load.

Buckle 62 is formed by conventional, complementary tongue and receiver parts 62a and 62b, respectively, in which receiver part 62b receives and releasably holds tongue 62a. Preferably, both of buckle parts 62a and 62b are provided with integrally formed lap belt length adjusters 68 and 70, respectively. The adjacent ends of lap belt portion 60a and 60b are threaded through adjusters 68 and 70, respectively, such that the free ends of the lap belts face up and can thus be conveniently grasped by the user and pulled laterally outwardly. Adjacent, but spaced from, the free ends of belt portions 60a and 60b, the web is doubled over and sewn together to form stops 72 and 74, respectively, which will not pull through adjusters 68 and 70 and when pulled there against leave tabs 72a and 74a which can be easily grasped for tightening the lap belt. It is noted that lap belt 60 is anchored in a positive fashion between side anchor points 20 and 22 so that when belt 60 is snugly tightened against the occupant's body, any tension load on belt 60 will be borne directly by anchor brackets 26 and 28.

Now, the lower free ends of shoulder strap segments 30b and 32b that have been looped through openings 44 and 46 of hooks 48 and 50, are laid congruently along the inwardly extending lap belt portions 60a and 60b. The excess length of segments 30b and 32b is such that after they have been passed through hooks 48 and 50, they are extended along belt portions 60a and 60b to approximately the midpoints of portions 60a and 60b, where the free ends of segments 30b and 32b are joined at attachment points 76 and 78 to belt portions 60a and 60b, respectively. Attachment points 76 and 78, may be provided by sewing or otherwise suitably fastening the webbing materials together over a limited area adjacent strap segment ends 80 and 82. Attachment points 76 and 78 are located so that segments 30b and 32b can be pulled back through eye openings 44 and 46 over a considerable distance for slackening the shoulder straps 30 and 32 before further such slackening is obstructed by attachment points 76 and 78 encountering anchor hooks 48 and 50. During such slackening of shoulder straps 30 and 32, buckle 62 has been released so that the lengths of lap belt portions 60a and 60b that initially lay beneath the shoulder strap segments 30b and 32b, are drawn up in loose bights 60a' and 60b' as shown in FIG. 2.

Preferably, and for the reasons more fully explained below, attachment points 76 and 78 are located at a sufficient distance along lap belt portions 60a and 60b from anchor hooks 48 and 50 to provide enough excess length to the shoulder strap segments 30b and 32b to provide for adequate shoulder strap slackening. On the other hand, attachment points 76 and 78 must be located sufficiently outboard of buckle 62 so as to permit adjusters 68 and 70 to adjust lap belt 60 down to a predetermined minimum length for fitting a small person.

With reference to the stowed configuration of restraint 11 as shown in FIG. 2, shoulder strap adjusters 40 and 42 are preferably provided with fastening devices on which the complementary buckle part 62a and 62b can be hung during non-use of the restraint.

Preferred fasteners for this purpose are downwardly projecting, auxillary buckle parts 86 and 88 mounted on strap adjusters 40 and 42, to which the actual buckle parts 62a and 62b can be releasably connected.

More specifically as illustrated in FIGS. 3a and b, auxillary buckle parts 86 and 88 are arranged on straps 30 and 32 and their adjusters 40 and 42, such that the complement of the respective tongue and receiver parts 62a and 62b are located on the same side of the restraint. Thus, adjuster 40 is constructed with a receiver 86 for releasably holding the tongue part 62a of buckle 62, wherein receiver 86 and tongue part 62a are adjacent the same side of the seat. Similarly, on the opposite side, adjuster 42 is made with an auxillary tongue 88 for being releasably engaged by the buckle receiver part 62b. Receiver 86 and tongue 88 may be made of non-load bearing structures and materials. For example, receiver 86 is here made of a resilient plastic material, molded in a flat, tubular shape, defining an opening 90 at the lower end that is suitable for receiving the thickness and width of tongue part 62a. Receiver 86 is permanently fastened to a lower flange portion 40a of adjuster 40 by rivets 92 so that with shoulder strap 30 draped downwardly on seatback 16 (FIG. 2), receiver 86 projects downwardly for receiving the upwardly inserted tongue part 62a. A front wall of receiver 86 is formed with a centrally positioned, circular depression 94 to create a boss on the inside surface of the receiver's front wall and thereby form a restriction interiorly of receiver 86. The interior restriction resiliently yeilds upon insertion or removal of tongue part 62a, and engages an aperture 96 therein, to releasably hold part 62a in place during stowage.

Similarly, on the opposite shoulder strap adjuster 42, auxillary tongue 88 is made of a plastic material, substantially in the same shape as the actual tongue part 62a, and is fastened to a lower flange portion 42a of the adjuster by rivets 98. Tongue 88, in a manner similar to receiver 86, is oriented so as to project downwardly, when strap 32 and adjuster 42 are draped down the seat back 16 (FIG. 2), for insertion into receiver part 62b as the latter is moved upwardly into engagement. Receiver part 62b is disengaged and removed from the stowed position by lifting release element 100 on part 62b.

Additionally, as shown in FIGS. 1, 3a and 3b, the webbing material that provides the lower shoulder strap segments 30b and 32b, is after being threaded through adjusters 40 and 42, doubled over on itself and sewn together to form stops 102 and 104 which cannot be pulled through adjusters 40 and 42. Stops 102 and 104 are suitably spaced from the free ends of shoulder strap segments 30b and 32b to provide tabs 102a and 104a of webbing material that can be grasped by the user for cinching up the shoulder strap harness.

OPERATION

With reference to FIG. 1, the normal, and non-emergency release sequence of restraint 11 is as follows. First, shoulder harness adjusters 40 and 42 are released to their fullest extent, forcing stops 102 and 104 of lower strap segments 30b and 32b up against adjusters 40 and 42, respectively. Then lap buckle 62 is released and the buckle parts 62a and 62b are pulled apart to cause adjusters 68 and 70, respectively, to lengthen lap belt portions 60a and 60b to the maximum extent. This operation forces stops 72 and 74 up against adjusters 68 and 70, respectively. Having separated buckle parts 62a and 62b and lengthened belt portions 60a and 60b to the fullest extent, lap belt 60 is now stowed by attaching the buckle parts to the auxillary, complementary receiver and tongue 86 and 88, respectively, on adjusters 40 and 42. This is done while remaining seated. At this stage, the lap belt portions have been separated and stowed, and shoulder straps 30 and 32 have been slackened to the maximum extent, so that it is an easy matter for the occupant to slip his or her shoulders out of the shoulder harness and step out of the seat, leaving restraint 11 in the stowed configuration as shown in FIG. 2.

For the quickest possible exit under emegency conditions, the occupant merely needs to release the belt buckle 62 and slip out of the shoulder harness. The opening of buckle 62 automatically relieves tension on the lower shoulder strap segments 30b and 32b allowing them to be pulled through openings 44 an 46 on anchor hooks 48 and 50, slackening straps 30 and 32 to allow quick escape.

The normal donning procedure is also quick and easy. With the shouler straps 30 and 32 in the stowed configuration as shown in FIG. 2, lengthened to the fullest extent, the user in one continuous motion with each hand slips into the shoulder harness. Then buckle parts 62a and 62b are released from their stowed positions on shoulder adjusters 40 and 42, and pulled together across the lap and fastened as shown in FIG. 1. Immediately thereafter, before adjusting the shoulder straps, the lap belt 60 is cinched up snugly over the lap by pulling in opposite directions on the free end tabs 72a and 74a of lap belt portions 60a and 60b which project beyond the stops 72 and 74. Lap belt 60 has now secured the occupant's lower torso in a positive fashion, between side anchor points 20 and 22. As a last donning step, the shoulder strap adjusters 40 and 42 are used, by pulling downwardly on the free end tabs 102a and 104a of lower strap segments 30b and 32b until the shoulder harness is snug.

For maximum effectiveness, it is important that the sequence of cinching up lap belt 60 precede the cinching of shoulder harness straps 30 and 32. If the shoulder harness is tightened first, the lap belt 60, when it is subsequently cinched up, may be pulling on the lower shoulder strap segments 30b and 32b that are looped through anchor hooks 48 and 50. That condition is undesirable, inasmuch that tests have shown that the safest restraint is one in which the lap belt 60 is secured by independent achorage points, which cannot give, such as might be the case if shoulder strap segments 30b and 32b were caused to slip through eye openings 44 and 46 of anchor hooks 48 and 50.

It is noted that the positive anchorage of the opposed ends of seat belt 60, provided in the foregoing manner, is preferred even though anchor hooks 48 and 50 are constructed and interconnected with the various webs so as to provide as described above, non-slip, friction fittings for strap segments 30b and 32b when placed under tension. While the non-slip feature of hooks 48 and 50 would be effective in most instances to prevent slackening of lap belt 60 under dynamic load restraint conditions, it is preferred that the lap belt 60 be positively anchored and thus have no opportunity to develop slack. The disclosed configuration of lap belt 60, whereby the ends are fastened directly to anchor hooks 48 and 50, and the sequence of donning restraint 11, by which lap belt 60 is snugged first before tightening shoulder harness straps 30 and 32, eliminates the possibility of the lap belts slackening under dynamic loading.

The non-slip anchoring of the shoulder strap segments 30b and 32b will normally prevent slippage of segments 30b and 32b in the opposite of the above direction, i.e., slackening of the shoulder harness' straps at the expense of excessive tightening of lap belt 60. If slippage were allowed to occur at anchor hook 48 and 50 by omitting the non-slip friction fittings thereat, forward acceleration of the occupant's upper torso might apply such tension to straps 30 and 32 that the lower segments 30b and 32b would be pulled through eye openings 44 and 46 and cause excessive tightening of lap belt 60 and possible injuries to the occupant's abdominal and pelvic region. Thus, the above-described construction and arrangement of anchor hooks 48 and 50 which prevents slippage of strap segments 30b and 32b is preferred.

Although the particular location of attachment points 76 and 78 for shoulder strap segments 30b and 32b along belt portions 60a and 60b may vary depending upon the location of the anchor points, the dimensions of seat 12 and the size range of the occupants to be fitted, in one embodiment of the invention attachment point 76 and 78 were located so as to provide approximately 8 inches of excess shoulder strap webbing available for being pulled back through anchor hooks 48 and 50. The 8 inches of slack on each side of the restraint 11 enabled sufficient loosening of the shoulder harness straps 30 and 32 to allow for rapid, emergency escape from restraint 11. Furthermore, 8 inches of available slack between anchor hooks 48, 50 and attachment points 76 and 78, left sufficient lengths of unobstructed webbing along belt portions 60a and 60b adjacent buckle 62 to allow length adjusters 68 and 70 to adjust the lap belt 60 down to a size suited for fitting the smallest anticipated occupant.

While only a particular embodiment of the invention has been disclosed herein, it will be readily apparent to persons skilled in the art that numerous changes and modifications can be made thereto including the use of equivalent means and devices without departing from the spirit of the invention. For example, as previously mentioned, the illustrated embodiment of the invention is a five-point anchor system in which the upper ends of the shoulder straps 30 and 32 are merged and joined to one upper anchor point 18. Alternatively and still in accordance with the invention, shoulder straps 30 and 32 may be kept separate and individually anchored to behind-the-head anchor points, thereby forming a six-point anchor system. Thus it will be appreciated that the principles of the invention are applicable to both the five-point and six-point anchor systems.

The embodiments of the invention in which an exclusive property of privilege is claimed are defined as follows:

1. In a combined shoulder harness and lap belt restraint apparatus for cooperative arrangement with a seat and associated seat back, and which includes first and second shoulder straps that extend forwardly from a shoulder harness anchor means located behind the seat back so as to pass over opposite shoulders of an occupant and downwardly therefrom along the sides of an occupant's upper torso toward first and second side anchor means respectively located adjacent opposite sides of the seat, and a lap belt that pases across an occupant's lap and includes first and second belt portions releasably connected together at their adjacent ends by lap buckle means and separately and fixedly attached at their remote ends to said first and second side anchor means, respectively, wherein the improvement comprises:

anchor guide means provided on each of said first and second side anchor means, said first and second downwardly extending shoulder straps being separately and respectively looped through said anchor guide means on said first and second anchor means, and the end portions of the thusly looped first and second shoulder straps being drawn respectively inwardly from said first and second side anchor means so as to lie along said first and second belt portions, respectively; and first and second attachment means, said first attachment means for fixedly attaching the end portion of said first shoulder strap to said first belt portion at a point thereon intermediate said first side anchor means and said lap buckle means, and said second attachment means for fixedly attaching the end portion of said second shoulder strap to said second belt portion at a point thereon intermediate said second side anchor means and said lap buckle means.

2. The improvement set forth in claim 1 wherein said anchor guide means on each of said side anchor means comprises friction means for preventing slippage of said shoulder straps thereat when said shoulder straps are placed under tension.

3. The improvement set forth in claim 1 wherein said points on said first and second lap belt portions at which said first and second attachment means attach the respective end portions of said first and second shoulder straps are further defined as being located a predetermined distance measured inwardly from said first and second side anchor means so as to allow said shoulder straps to slip back through said anchor guides on said first and second side anchor means to said points of attachment in order to provide slack in said first and second shoulder straps respectively between said first side anchor means and said shoulder harness anchor means and between said second side anchor means and said shoulder harness anchor means.

4. The improvement set forth in claim 1 wherein said lap buckle means comprises first and second releasably interconnecting buckle parts, said first buckle part comprising a first belt adjuster means for connecting said first buckle part to said first lap belt portion at an adjustable location therealong, said first adjuster means including means for cooperating with said first lap belt portion so as to provide adjustable lap belt lengths ranging between predetermined minimum and maximum, and said point on said first lap belt portion that is associated with said first attachment means being located at a predetermined distance along said first lap belt portion that is substantially at said first adjuster means when said first adjuster means is adjusted to provide said predetermined minimum lap belt length, whereby a maximum amount of slackening of said first shoulder strap is provided while permitting adjustment of said first adjuster means along said first lap belt portion to a minimum lap belt length.

5. The improvement set forth in claim 4 wherein said second buckle part comprises a second buckle adjuster means for connecting said second buckle part to said second lap belt portion at an adjustable location therealong, said second adjuster means including means for cooperating with said second lap belt portion so as to provide together with said first adjuster means and said first lap belt portion adjustable lap belt lengths ranging between said predetermined minimum and maximum, and wherein said point on said second lap belt portion that is associated with said second attachment means being located at a predetermined distance along said second lap belt portion that is substantially at said second adjuster means when said second adjuster means is adjusted to provide said predetermined minimum length.

6. The improvement set forth in claim 1 further comprising first and second buckle attachment means respectively mounted on said first and second shoulder straps intermediate said shoulder harness anchor means and said first and second flight anchor means, and means associated with said lap buckle means for attaching said buckle means to said first and second attachment means for stowing said buckle means and the adjoining first and second lap belt portions when the restraint apparatus is not being worn.

7. The improvement set forth in claim 6 wherein said lap buckle means comprises first and second complementary and releasably engagable parts, and said first and second attachment means comprised attachment parts that correspond to and complement said first and second buckle parts for releasable connection of said first and second buckle parts to said first and second attachment means.

8. The improvement set forth in claim 7 wherein said first buckle part comprises an apertured tongue and said second buckle part comprises a receiver into which said tongue is insertable for being releasably held by said receiver, and wherein said first and second attachment means on said first and second shoulder straps comprise non-structural receiver and tongue-shaped members which complement said tongue and receiver of said buckle means for being releasably connectable thereto.

9. A combined shoulder harness and lap belt restraint apparatus for cooperative arrangement with a seat and associated seatback, comprising:

first and second shoulder straps anchored at the upper ends and arranged to extend in laterally spaced apart relation, downwardly along the seatback and then outwardly toward opposite sides of the seat;

first and second side anchor means respectively located adjacent opposite sides of the seat;

a lap belt including first and second belt portions and a lap buckle means for releasably connecting adjacent ends of said lap belt portions and means for fixedly attaching the remote ends of said first and second belt portions respectively to said first and second anchor means;

anchor guide means provided on each of said first and second side anchor means, said first and second downwardly extending shoulder straps being separately and respectively looped through said anchor guide means on said first and second anchor means, and end portions of the thusly looped first and second shoulder straps being drawn respectively inwardly from said first and second side anchor means so as to lie along said first and second lap belt portions, respectively; and first and second attachment means, said first attachment means for fixedly attaching the end portion of said first shoulder strap to said first belt portion at a point on said first belt portion lying intermediate said first side anchor means and said lap buckle means, and said second attachment means for fixedly attaching the end portion of said second shoulder strap to said second belt portion at a point on said second belt portion lying intermediate said second side anchor means and said lap buckle means.

* * * * *